United States Patent [19]

Matthiesen et al.

[11] Patent Number: 4,861,966
[45] Date of Patent: Aug. 29, 1989

[54] METHOD AND APPARATUS FOR ELECTRICALLY HEATING DIESEL FUEL UTILIZING A PTC POLYMER HEATING ELEMENT

[75] Inventors: Martin Matthiesen, Fremont; Michelle Small, Mountain View, both of Calif.

[73] Assignee: Raychem Corporation, Menlo Park, Calif.

[21] Appl. No.: 864,930

[22] Filed: May 19, 1986

Related U.S. Application Data

[63] Continuation-in-part of Ser. No. 787,218, Oct. 15, 1985, Pat. No. 4,689,875.

[51] Int. Cl.⁴ .................... F02M 31/12; F24H 1/10; H05B 3/00; H01C 1/14
[52] U.S. Cl. .................... 219/205; 123/549; 123/557; 210/186; 219/306; 219/505; 219/541; 219/548; 252/511; 338/22 R; 338/212; 338/214; 338/328
[58] Field of Search .................... 219/205–208, 219/300, 306, 307, 504, 505, 528, 541, 543, 548, 549, 552, 553; 210/184, 186; 123/549, 557; 338/212, 214, 22 R, 328; 252/511

[56] References Cited

U.S. PATENT DOCUMENTS

| | | | |
|---|---|---|---|
| 2,669,299 | 2/1954 | Roach | 158/36 |
| 3,061,501 | 10/1962 | Dittman et al. | 219/543 X |
| 3,564,199 | 2/1971 | Blaha | 219/311 |
| 3,582,968 | 6/1971 | Buiting et al. | 219/505 X |
| 3,935,901 | 2/1976 | Virgil | 165/52 |
| 3,989,019 | 11/1976 | Brandt et al. | 123/122 |
| 4,091,265 | 5/1978 | Richards et al. | 219/501 |
| 4,188,276 | 2/1980 | Lyons et al. | 219/528 X |
| 4,314,231 | 2/1982 | Walty | 338/212 X |
| 4,321,136 | 3/1982 | Matsui | 219/205 X |
| 4,327,351 | 4/1982 | Walker | 219/553 X |
| 4,372,279 | 2/1983 | Parks | 219/205 X |
| 4,387,691 | 6/1983 | Marcoux et al. | 123/557 |
| 4,406,785 | 9/1983 | Siefer | 210/186 |
| 4,447,706 | 5/1984 | Eder et al. | 123/549 X |
| 4,473,054 | 9/1984 | Marcoux et al. | 210/184 |
| 4,529,866 | 7/1985 | Leary | 219/307 X |
| 4,571,481 | 2/1986 | Leary | 219/205 |
| 4,585,924 | 4/1986 | Pakula | 219/205 |
| 4,650,576 | 3/1987 | Leary et al. | 210/184 |
| 4,689,475 | 8/1987 | Matthiesen | 219/553 |

FOREIGN PATENT DOCUMENTS

| | | | |
|---|---|---|---|
| 2316054 | 10/1974 | Fed. Rep. of Germany | 219/307 |
| 932558 | 7/1963 | United Kingdom | 219/300 |
| 2106920 | 9/1981 | United Kingdom | 219/205 |
| 2100559 | 12/1982 | United Kingdom | 219/306 |

Primary Examiner—Anthony Bartis
Attorney, Agent, or Firm—Timothy H. P. Richardson; Herbert G. Burkard

[57] ABSTRACT

Diesel fuel is heated prior to filtration by passing it in thermal contact with a laminar heater immersed in the fuel. The heater has a resistance at room temperature of 0.30 to 0.75 ohm and comprises a PTC conductive polymer resistive heating element sandwiched between equispaced imperforate metal foil electrodes, particularly electrodeposited foil electrodes, coextensive with resistive heating element. The conductive polymer has a resistivity at room temperature of 20 to 2000 ohm - cm. The resistive element has a cross-sectional area in a plane parallel to the electrodes of 3 to 10 square inches and the electrodes have a microrough surface in direct physical contact with the conductive polymer.

13 Claims, 1 Drawing Sheet

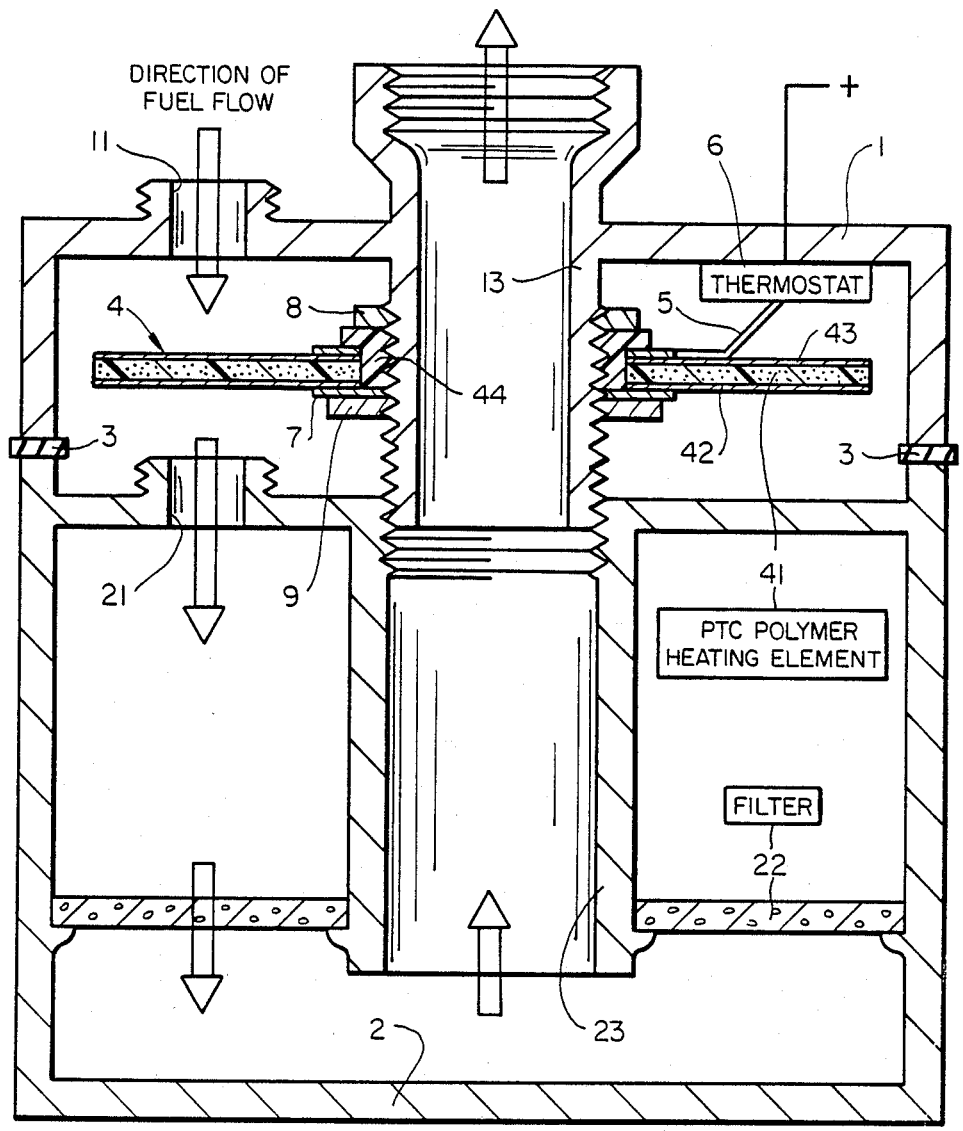
FIG_1

METHOD AND APPARATUS FOR ELECTRICALLY HEATING DIESEL FUEL UTILIZING A PTC POLYMER HEATING ELEMENT

BACKGROUND OF THE INVENTION

CROSS-REFERENCE TO RELATED APPLICATION

This application is a continuation-in-part of copending commonly assigned application Ser. No. 787,218 filed Oct. 15, 1985, by Kleiner and Matthiesen, now issued to Matthiesen alone as U.S. Pat. No. 4,689,475 the entire disclosure of which is incorporated herein by reference.

FIELD OF THE INVENTION

This invention relates to the filtering of diesel fuel as it passes from a fuel tank (or other fuel source) to a diesel engine.

INTRODUCTION TO THE INVENTION

If diesel fuel becomes too cool, higher molecular weight hydrocarbons therein can solidify, causing "clouding" of the fuel. These solids can block the pores of a fuel filter through which the fuel is pumped, causing the engine to lose power (or stop) or preventing the engine from starting. In order to prevent this, various methods have been proposed for heating diesel fuel before it reaches the filter. For disclosure of such methods, reference may be made of example to U.S. Pat. Nos. 2,669,299, 3,564,199, 3,935,901, 3,989,019, 4,091,265, 4,372,279, 4,387,691, 4,406,785, 4,529,866 and 4,571,481, and copending and commonly assigned U.S. patent application No. 687,120, filed Dec. 28, 1984, now U.S. Pat. No. 4,650,576. The disclosure of each of those patents and patent applications is incorporated herein by reference.

One class of known diesel fuel heaters comprises an elongate PTC conductive polymer strip heater which may be inserted in the fuel line, or arranged in the form of a coil and placed in the top of a filter or in a separate container which fits between the fuel line and the filter. Such heaters have proved very valuable, but their manufacturing costs are higher than is desirable, and their power density is too low, especially for car and light trucks.

Another class of known diesel fuel heaters comprises a plurality of ceramic PTC heating elements mounted on a metal plate to provide heat transfer to the fuel (a plurality of such heating elements must be used because ceramic heaters can only be manufactured in limited sizes and shapes). Such heaters suffer from the disadvantage inter alia that multiple connections to the individual heating elements are required, thus increasing the manufacturing complexity of the heater.

SUMMARY OF THE INVENTION

We have now discovered that the disadvantages of the known heaters can be overcome through the use of a sheet heater comprising a laminar resistive element which is composed of a conductive polymer, preferably a PTC conductive polymer. The electrodes of the heater are preferably placed on opposite faces of the resistive element so that current passes through the resistive element substantially at right angles to the plane thereof. Particularly preferred electrodes are continuous (i.e. non-apertured) metal foil electrodes, especially electrodeposited foil electrodes and the like as disclosed in U.S. Pat. No. 4,689,475 referred to above, which adhere particularly well to conductive polymers. Thus it is preferred that each of the electrodes has a microrough surface which (i) is in direct physical contact with the conductive polymer and (ii) has irregularities which protrude from the surface by a distance of 0.1 to 100 microns and have at least one dimension parallel to the surface which is at most 100 microns.

Laminar conductive polymer heaters have substantially higher power densities than strip heaters and the efficiency of the heat transfer to the fuel from such a heater is excellent. Furthermore, such a heater can be made in almost any shape, by cutting the heater from a large sheet heater, which makes it much easier to obtain efficient heating within the spatial constraints set by the design of the filter and fuel supply system. In addition, if the heater is a flexible one, the heater can if desired be bent into a shape, e.g. a cylinder, which will further promote improved heat transfer, e.g. by controlling the turbulence of the fuel flow. The fuel preferably comes into direct physical contact with electrically conductive parts of the heater; however, contact between the diesel fuel and the conductive polymer heating element is preferably minimized, for example by using a heater which comprises a conductive polymer heating element which is sandwiched between two continuous metal foils, e.g. of nickel, or copper, or nickel-plated copper. However, if desired, an insulating jacket, e.g. of an epoxy material, can be placed over the exposed parts of the conductive polymer (or the whole heater except for the power and/or earth connections), and this may be necessary if the conductive polymer is one which is susceptible to attack by diesel fuel. To ensure that the conductive polymer has satisfactory resistance to diesel fuel, it is preferably based on polyvinylidene fluoride, especially polyvinylidene fluoride having a head-to-head content of less than 5%, preferably less than 4%, as disclosed in copending, commonly assigned application Ser. No. 423,589, the disclosure of which is incorporated herein by reference. As is well known to those skilled in the art, polyvinylidene fluoride consists of recurring units of the formula $-CH_2CF_2-$, and the head-to-head content of a polyvinylidene fluoride is the percentage of units in the configuration $-CH_2CF_2-CF_2CH_2-$ rather than the normal head-to-tail configuration $-CH_2CF_2-CH_2CF_2-$.

In one preferred aspect, the present invention provides a method of filtering diesel fuel as it is pumped from a fuel source in which the fuel is at a temperature below its cloud point, which method comprises (1) heating incoming diesel fuel to a temperature above its cloud point by passing it in thermal contact with a laminar heater which is connected to a power supply and which comprises
  (a) first and second metal foil electrodes, and
  (b) a laminar resistive element which is sandwiched between the electrodes and which is composed of a conductive polymer; and (2) filtering the heated diesel fuel from step (1).

In a second preferred aspect, the present provides apparatus for heating and filtering diesel fuel which comprises (1) a heating chamber having an inlet port for incoming diesel fuel;

(2) within the heating chamber, a laminar electrical heater which is arranged to heat diesel fuel entering through the inlet port and which comprises (a) first and second metal foil electrodes which can be connected to a source of electrical power, and (b) a laminar resistive element which is sandwiched between the electrodes and which is composed of a conductive polymer;

(3) a filtering chamber; and (4) within the filtering chamber, a diesel fuel filter which is arranged to filter fuel which has been heated by the electrical heater.

In a third preferred aspect, the present invention provides apparatus for heating diesel fuel before it is filtered, which apparatus is suitable for fitting between a fuel filter and a fuel supply system which can be secured to the fuel filter, the fuel supply system comprising an incoming fuel line and an outgoing fuel line, and the fuel filter having an inlet port which can be secured to the incoming fuel line, and an exit pipe through which filtered fuel passes and which ends in an exit port which can be secured to the outgoing fuel line, which apparatus comprises (1) a heating chamber which comprises (a) an inlet port which can be secured to the incoming fuel line, and (b) an exit pipe which can be secured at one end to the outgoing fuel line and at the other end to the exit port of the fuel filter; and (2) within the heating chamber, a laminar electrical heater which is arranged to heat diesel fuel entering through the entry port and which comprises (a) first and second laminar electrodes which can be connected to a source of electrical power, and (b) a laminar resistive element which is sandwiched between the electrodes and which is composed of a conductive polymer.

Preferably the exit pipe runs up the middle of the heating chamber, so that the heating chamber is annular in shape and the heater is also annular.

BRIEF DESCRIPTION OF THE DRAWING

The invention is illustrated in the drawing, in which the sole FIGURE is a diagrammatic cross-section through an apparatus of the invention.

DETAILED DESCRIPTION OF THE INVENTION

The term "conductive polymer" is used herein to denote a composition which comprises a polymer component and, dispersed or otherwise distributed therein, a particulate conductive filler. Documents describing conductive polymer compositions and devices comprising them include copending commonly assigned U.S. Ser. Nos. 423,589, filed Sept. 27, 1982, by Van Konynenburg et al, 818,845 filed Jan. 14, 1986, by Rosenzweig, and 818,846, filed Jan. 14, 1986, by Barma. The disclosure of each of the applications referred to above is incorporated herein by reference.

The laminar heaters used in the present invention preferably have a resistance of 0.30 to 0.75 ohms, particularly 0.40 to 0.50 ohms, at room temperature, increasing by a factor of at least 5 between room temperature and 150° C. The resistivity of the conductive polymer is preferably 20 to 2000 ohm-cm, particularly 100 to 500 ohm-cm, at room temperature. The area of the heater is preferably 3 to 10 sq. inches, particularly 5 to 10 sq. inches.

Referring now to the drawing, the sole FIGURE is a diagrammatic cross-section of a cylindrical diesel fuel filter of the invention which comprises a heater section 1 and a filter section 2 which are screw fitted together with a gasket 3 between them. Filter section 2 is a conventional fuel filter with a fuel entry port 21 at the top, a fuel filter 22 near the bottom, and a fuel exit pipe 23 through which filtered fuel exits. Heater section 1 is designed so that it can if desired be fitted between a conventional fuel filter and the fuel entry and exit lines for the conventional filter; thus it comprises a fuel entry port 11 at the top and a fuel exit pipe 13 which is screw-threaded to the fuel exit pipe 23 of the filter section. Within the heater section is an annular heater 4 which comprises a conductive polymer heating element 41 sandwiched between metal foil electrodes 42 and 43. Preferably each of the electrodes has a microrough surface which (i) is in direct contact with the conductive polymer, and (ii) has irregularities which protrude from the surface by a distance of 0.1 to 100 microns and have at least one dimension parallel to the surface which is at most 100 microns. Insulating spacer 44 is provided between the heater and the exit pipe 13. The top electrode 43 is contacted by ring terminal 5 which passes through thermostat 6 to a power supply (not shown), typically the 12–14 volt battery of a vehicle. The bottom electrode 42 is contacted by metal washer 7 which is earthed. Screw-threaded nuts 8 and 9 secure the heater in place.

In use of the illustrated apparatus, cold diesel fuel enters through entry port 11, passes over heater 4 and is heated, passes through entry port 21 and filter 22, and exits through pipes 23 and 13.

The following Example illustrates the invention.

EXAMPLE

A heater suitable for use in the invention was made as follows.

The following ingredients were blended and extruded as a sheet about 12 inch wide and about 0.020 inch thick.

|  | Vol % |
|---|---|
| Polyvinylidene fluoride (KF1000 from Kureha a6) | 80.5 |
| Carbon Black (XC-72) | 16.0 |
| CaCO$_3$ | 2.0 |
| Triallyl a7 | 1.5 |

As extruded, the sheet had a resistivity of about 100 ohm.cm at room temperature and about 1000 ohm.cm at 150° F. The sheet was irradiated to a dose of about 20 Mrads, and was then laminated between electrodeposited nickel foil electrodes at a temperature of about 390° F. to give a laminate about 0.016 inch thick in which the conductive polymer had a resistivity of about 300 ohm-cm at room temperature. Annular heaters having an inner diameter of 1 inch and an outer diameter of about 2,875 inch were cut from the laminate.

The heaters, powered by a 14 volt DC power supply, were used to heat No. 2 diesel fuel at flow rates of 40 and 75 liters per hour in apparatus of the kind shown in the drawing and were found to have power outputs of 160 and 175 watts respectively.

We claim:

1. A method of filtering diesel fuel as it is pumped from a fuel source in which the fuel is at a temperature below its cloud point, the fuel source being in a vehicle and the fuel being pumped from the fuel source to a diesel engine in the vehicle, which method comprises (1) heating incoming diesel fuel to a temperature above its cloud point by passing it in thermal contact with a laminar heater which is immersed in the fuel, which has a resistance at room temperature of 0.30 to 0.75 ohm, which is connected to the battery of the vehicle and which comprises
   (a) first and second metal foil electrodes, and
   (b) a laminar resistive element which has a cross-sectional area, in a plane parallel to the electrodes, of 3 to 10 square inches, which is sandwiched between the electrodes, and which is composed of a conductive polymer having a resistivity at room temperature of 20 to 2,000 ohm-cm and exhibiting PTC behavior; the first and second electrodes being imperforate and coextensive with the resistive element; and
(2) filtering the heated diesel fuel from step (1).

2. A method according to claim 1 wherein the conductive polymer comprises a polymeric component which consists essentially of polyvinylidene fluoride.

3. A method according to claim 2 wherein the polyvinylidene fluoride has a head-to-head content of less than 4%.

4. A method according to claim 1 wherein each of the electrodes has a microrough surface which (i) is in direct physical contact with the conductive polymer and (ii) has irregularities which protrude from the surface by a distance of 0.1 to 100 microns and have at least one dimension parallel to the surface which is at most 100 microns.

5. A method according to claim 1 wherein the heater is in the shape of a flat annulus.

6. A method according to claim 1 wherein the heater has a resistance at room temperature of 0.40 to 0.50 ohm.

7. A method according to claim 1 wherein the conductive polymer has a resistivity at room temperature of 100 to 500 ohm-cm.

8. Apparatus for heating and filtering diesel fuel which comprises (1) a heating chamber having an inlet port for incoming diesel fuel;
(2) within the heating chamber, a laminar electrical heater which is arranged to be immersed in and to heat diesel fuel entering through the inlet port, which has a resistance at room temperature of 0.30 to 0.75 ohm, and which comprises
   (a) first and second metal foil electrodes which can be connected to a source of electrical power, and
   (b) a laminar resistive element which has a cross-sectional area, in a plane parallel to the electrodes, of 3 to 10 square inches, which is sandwiched between the electrodes and which is composed of a conductive polymer having a resistivity at room temperature of 20 to 2,000 ohm-cm and exhibiting PTC behavior; the first and second electrodes being imperforate and coextensive with the resistive element;
(3) a filtering chamber which is in communication with the heating chamber; and
(4) within the filtering chamber, a diesel fuel filter which is arranged to filter fuel which has been heated by the electrical heater.

9. Apparatus according to claim 8 wherein the conductive polymer comprises a polymeric component which consists essentially of polyvinylidene fluoride.

10. Apparatus according to claim 9 wherein the polyvinylidene fluoride has a head-to-head content of less than 4%.

11. Apparatus according to claim 8 wherein each of the electrodes has a microrough surface which (i) is in direct physical contact with the conductive polymer and (ii) has irregularities which protrude from the surface by a distance of 0.1 to 100 microns and have at least one dimension parallel to the surface which is at most 100 microns.

12. Apparatus according to claim 8 wherein the heater has a resistance at room temperature of 0.40 to 0.50 ohm.

13. Apparatus according to claim 8 wherein the conductive polymer has a resistivity at room temperature of 100 to 500 ohm-cm.

* * * * *

UNITED STATES PATENT AND TRADEMARK OFFICE

CERTIFICATE OF CORRECTION

PATENT NO. : 4,861,966

DATED : August 29, 1989

INVENTOR(S) : Martin Matthiesen et al

It is certified that error appears in the above-identified patent and that said Letters Patent is hereby corrected as shown below:

In Column 4, line 46, after "Kureha", replace "a6" by --, which has a head-to-head content of 3.5 to 3.8%--.

In Column 4, line 49, after "Triallyl", replace "a7" by --isocyanurate, a radiation cross-linking agent--.

Signed and Sealed this

Eighteenth Day of June, 1991

Attest:

HARRY F. MANBECK, JR.

Attesting Officer

Commissioner of Patents and Trademarks